United States Patent [19]

Gallès

[11] 3,915,184
[45] Oct. 28, 1975

[54] VENTED FUEL TANK
[75] Inventor: Henri Charles Gallès, Rueil-Malmaison, France
[73] Assignees: Regie Nationale des Usines Renault, Billancourt; Automobiles Peugeot, Paris, both of France
[22] Filed: May 2, 1974
[21] Appl. No.: 466,461

[30] Foreign Application Priority Data
May 25, 1973 France .............................. 73.19208
July 27, 1973 France .............................. 73.27292

[52] U.S. Cl. ................. 137/43; 137/45; 220/85 VR
[51] Int. Cl.² ......................................... B65D 25/00
[58] Field of Search ...... 220/85 VS, 85 VR; 137/43, 137/45

[56] References Cited
UNITED STATES PATENTS
3,777,927  12/1973  Frickler ........................ 220/85 VR

*Primary Examiner*—Robert G. Nilson
*Attorney, Agent, or Firm*—Stevens, Davis, Miller & Mosher

[57] ABSTRACT

A vented fuel tank incorporating an expansion chamber with a first conduit connecting the tank to the expansion chamber for allowing liquid and gas in the chamber to be displaced by expansion into the expansion chamber, and a return conduit allowing return flow of fuel from the expansion chamber back to the tank upon contraction of the contents of the tank. The first, overflow conduit includes a distribution valve which communicates the expansion chamber with any one of a plurality of locations positioned at the extremities of the top of the tank such that the highest of these extremities is the one communicated with the expansion chamber under any inclination of the tank. The second, return conduit includes non-return valve means for preventing flow of liquid from the tank to the expansion chamber during expansion conditions, but for allowing flow of liquid in the reverse sense during contraction.

8 Claims, 9 Drawing Figures

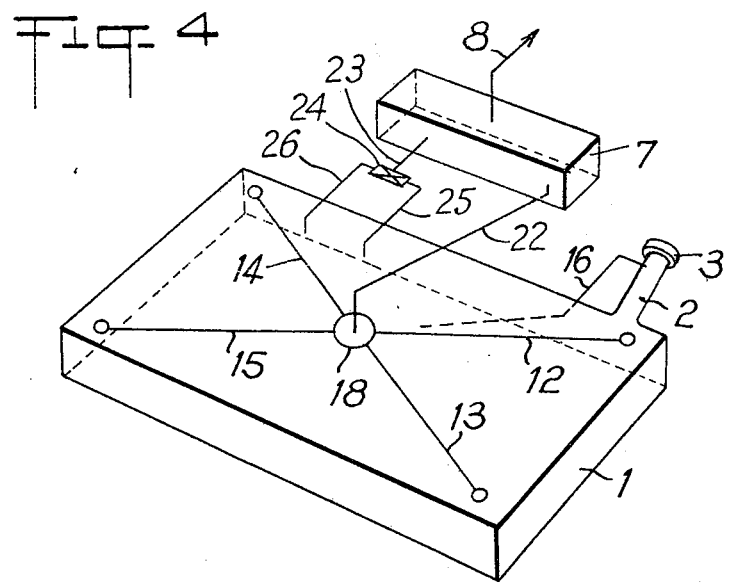
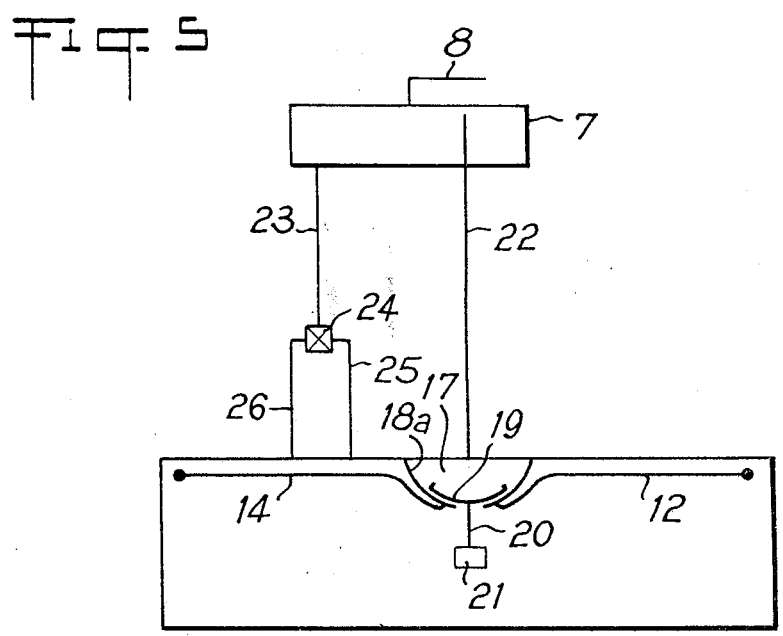

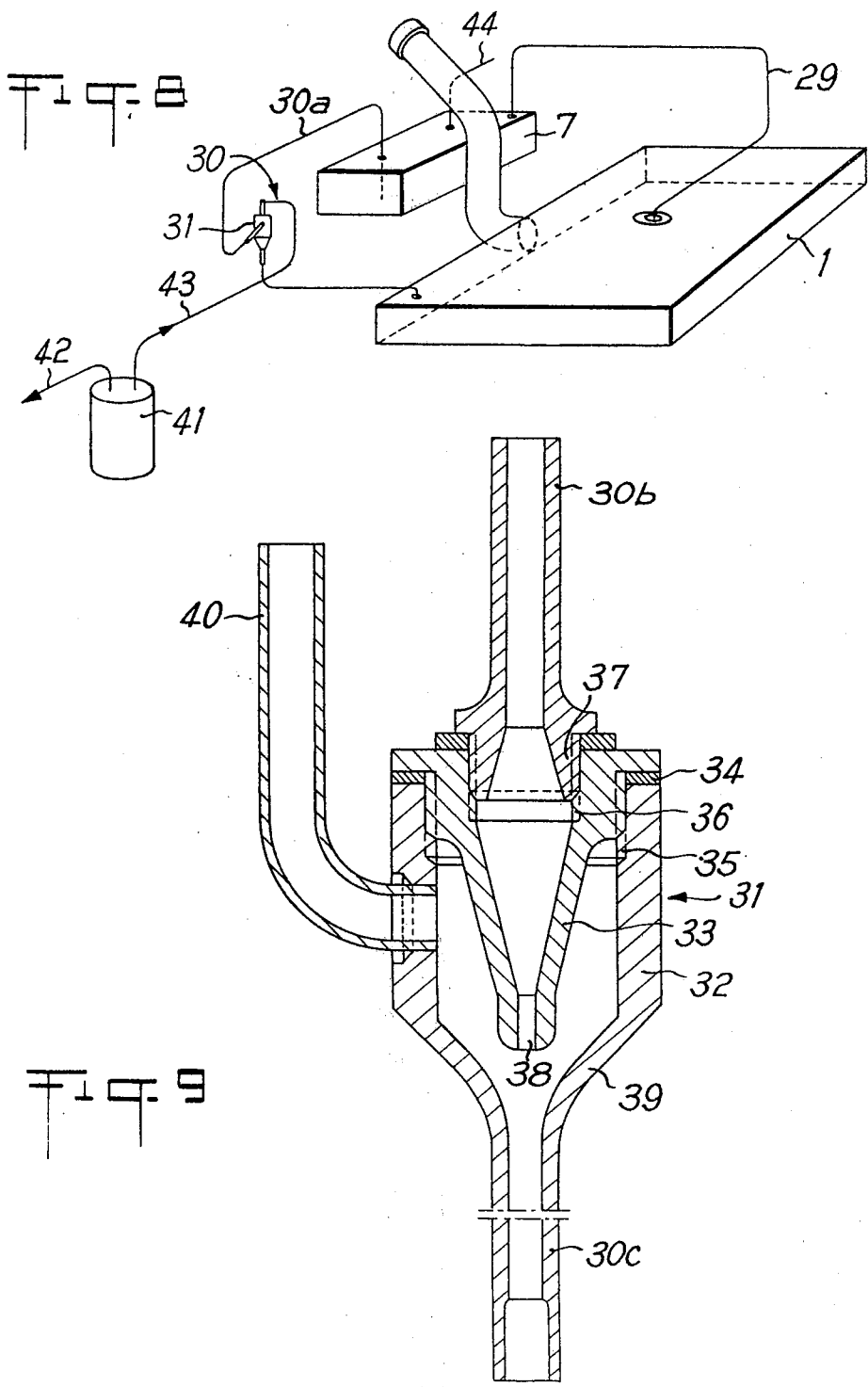

VENTED FUEL TANK

The present invention relates to a device for venting a fuel tank equipped with an anti-pollution means.

In order to prevent petrol vapours resulting from a rise of the temperature of the tank being dissipated into the atmosphere a hermetically closing petrol tank cap is used, which implies a supplementary device for venting the contents of the tank to atmospheric pressure. This is achieved by means of a duct issuing from the upper part of the tank and directed towards a container called a "canister" and containing activated charcoal which absorbs the petrol vapours entrained by the excess of air escaping from the tank so that after this treatment the air expelled into the atmosphere is totally free of pollutants. It is necessary to provide, between the petrol tank and the canister, an expansion vessel intended to collect and then return to the tank any excessive amounts of petrol which may be expelled from the tank under certain conditions and which would otherwise flood the canister.

In fact, if the air were to be removed at any arbitrary point of the upper part of the tank this could, depending on the inclination of the tank, result in the opening of the venting duct being submerged and, under increased temperatures of the fuel, for example 30°C., liquid of the order of 5 liters could be driven back into the expansion vessel. Now, this quantity is too greeat for certain small vehicle classes and it is the object of the invention to provide an arrangement which enables this limiting volume of liquid to be reduced.

According to the present invention there is provided a system for venting a fuel tank and equipped with an anti-pollution means, comprising an expansion vessel, at least two conduits adapted to be connected between the tank and an expansion vessel, one of the conduits through which the liquid and the gases arrive having a first end which opens in the expansion vessel at a higher level than does the second conduit through which the liquid returns, a plurality of venting conduits connected to the second end of said one conduit by means of a gravity responsive distribution valve, the other conduit including a non-return valve preventing fuel flow along that conduit in a direction towards said expansion chamber.

In order that the present invention may more readily be understood, the following description is given merely by way of example with reference to the accompanying drawings in which:

FIG. 4 is a view in perspective of a first embodiment of the deaerating or venting device according to the invention;

FIG. 5 is a view in elevation and in section of the device shown in FIG. 4;

FIG. 8 is a schematic view of the assembly of the deaerating device according to the invention; and FIG. 9 is a view in longitudinal section of the repriming means.

FIGS. 1 to 3 are by way of explanation of the problem to be solved by this invention but do not themselves illustrate the invention.

Figure 1:
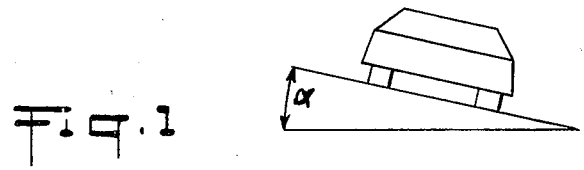
FIG. 1 is a schematic view showing the lateral inclination of a vehicle.
Figure 2:
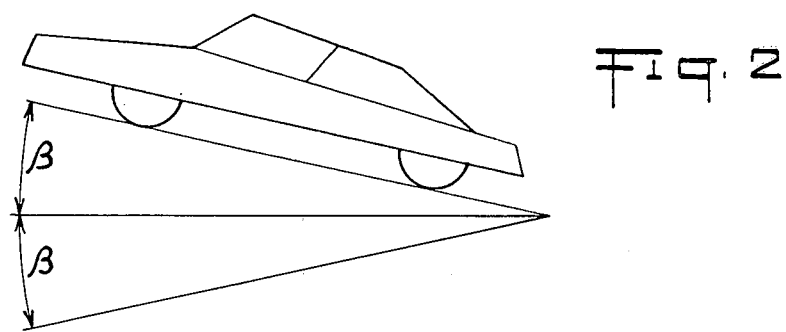
FIG. 2 is a schematic view showing the longitudinal inclination of a vehicle.

In FIGS. 1 and 2 there is shown a vehicle in the extreme conditions which the device must be able to cope with, i.e. a sideways inclination of the vehicle at an angle $\alpha$ (FIG. 1) the value of which may be 8° or 12% in either direction, and a longitudinal inclination at an angle $\beta$ (FIG. 2) the value of which may be 18° or 32% either way from the horizontal. Since the filling temperature is 15°C., the tank temperature is capable of rising by 25°C.

Figure 3:
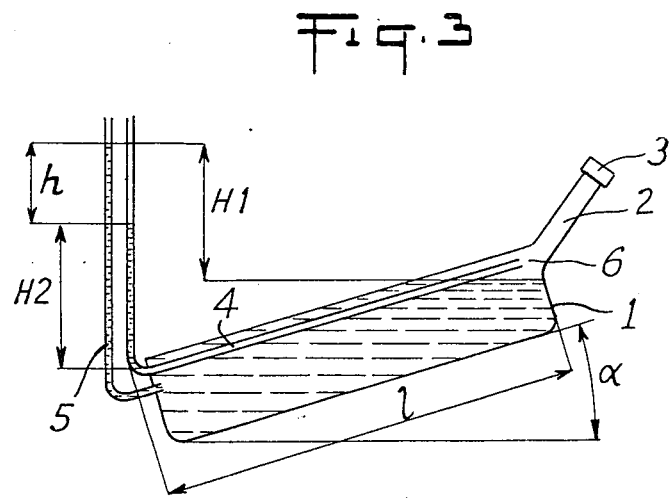
FIG. 3 is a view of an inclined tank and of the conduits for evacuating the gases.

In FIG. 3 there is shown a fuel tank 1 of a vehicle which is laterally inclined at the angle $\alpha$ shown in FIG. 1, while the temperature has risen by $\Delta T$. The air contained in the tank is thus under pressure since the filler pipe 2 is hermetically shut by a filler cap 3.

The tank 1 includes two conduits 4 and 5 which open respectively at the two ends of the tank; one of the conduits, 4, emerges in an air pocket 6 intended to be free of fuel while the other conduit 5 opens into the liquid. It will be seen that with an inclination in the opposite direction the end of the conduit 4 will be immersed and that of the conduit 5 will emerge; this explains the presence of fuel, more particularly petrol, in the conduit 4 in the present case.

Before venting of the pocket 6 can take place it is thus necessary to evacuate the liquid contained in that conduit 4 which ends at the pocket 6. When considering the levels of liquid in the vertical portion of the conduits 4 and 5 it can be seen that the pressure P prevailing in the air pocket 6 is balanced by a column $H_2$ of liquid in the conduit 4 and $H_1$ in the conduit 5. It is apparent that the height of the upper portion of each of these columns differs and one is spaced from the other by a height h.

In FIG. 4 there is shown a venting device according to the invention wherein a fuel tank 1 provided with a filler pipe 2 hermetically closed by a filler cap 3, comprises four pressure tappings in the form of conduits 12, 13, 14, 15 arranged at the four corners of the upper part of the tank 1 and ending at a distributor 18 positioned in the middle of the tank 1.

The distributor 18 is connected by a conduit 22 (FIGS. 4 and 5) to an expansion vessel from which the air escapes, via a conduit 8, toward a canister or anti-pollution means not shown in the drawing. The conduit 22 opens in the upper portion of the vessel 7. The bottom of the vessel 7 is connected to a conduit 23 for return of the fuel and this conduit is connected to the tank 1 via a diaphragm valve 24 and conduits 25, 26. Moreover, the filler pipe 2 is in known manner provided with an anti-backflow conduit 16.

It is apparent from FIG. 4 that if the conduit 22 extended by any one of conduits 12, 13, 14 or 15 and the conduit 23 extended by the conduit 26 (these possible routes corresponding to conduits 5 and 4 of FIG. 3) were to open at the same level, i.e. at the base of the expansion vessel 7, the pressure P acting on the surface of the liquid in the air pocket 6 would, given the difference in level h, tend to cause the fuel to flow preferentially through the conduit 22, before emptying the conduit 23 so as to allow the air to expand. This would thus imply a large capacity of the vessel 7 or damage to the canister.

In order to remedy this defect the conduit 22 is made to open at a higher level than the end of the conduit 23 and this by the height h already mentioned. The height h is calculated by the relation $h = l \sin \alpha$ in which $l$ is the lateral dimension of the tank 1 comprised between those two of the outlets of greater difference of level of the conduits 12, 13, 14 or 15 which are at the greatest vertical spacing for any given angle $\alpha$ of inclination of the tank to the horizontal when tilted about any desired horizontal axis.

So that this effect should work regardless of the attitude of the vehicle there is provided, as shown in FIG. 4, a distributor 18 connected to the four conduits 12, 13, 14, 15 which end at the four corners of the tank.

As is shown in FIGS. 4 and 5 the conduits 12, 13, 14 and 15 end in a chamber 17 of the distributor 18 which is defined by a spherical cap 18a and the upper wall of the tank 1, the said cap 18a being positioned in the centre of the tank 1.

This spherical cap 18a forms a seat for a shutter consisting of a small spherical cup 19 having the same radius of curvature as that of the spherical cap. The small spherical cup 19 supports at its base a pendulum formed of a stem 20 provided with a mass 21, the said pendulum being orientable according to the attitude of the vehicle and entraining the spherical cup 19 during the course of its movements.

Figure 6:
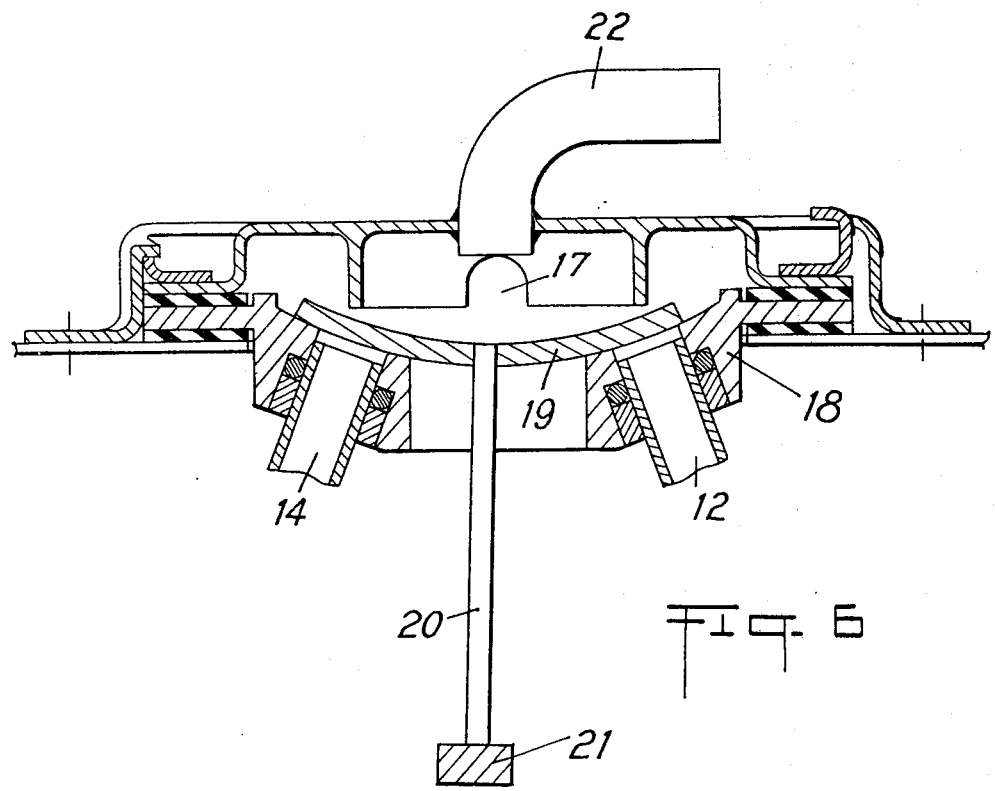
FIG. 6 is a view in section of a distribution element.

The dimensions of this small cup are such that when at rest it covers the outlet orifices of the conduits 12 to 15 in the cap 18a. But, depending on the inclination of the vehicle and under the action of the pendulum 20, 21 it uncovers, and thus brings into operation the corresponding conduit. Such a valve illustrated merely schematically in FIG. 5 is shown in detail in FIG. 6.

The liquid or gaseous exchanges emanating from the tank 1, via the respective uncovered conduit (12 to 15) and the spherical cap 18a, end in the expansion vessel 7 through the chamber 17 of the distributor and the line 22. The air escapes via the line 8 which ends at the canister, while the liquid accumulates in the vessel 7 or returns to the tank via the conduit 23.

The conduit 23 is provided with a non-return valve 24 which prevents liquid rising back via this conduit in the event of excess pressure within the tank.

It should be noted that in all cases the fuel from the expansion vessel 7 returns to the tank 1 via the conduit 23 as soon as a sufficient pressure drop of the air in the pocket 6 has occurred.

Figure 7:
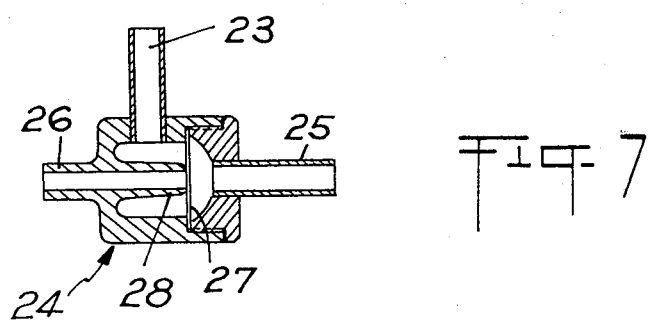
FIG. 7 is a view in section of a diaphragm valve.

Referring to FIG. 7 it is seen that this non-return valve 24 comprises three inlets 23, 25 and 26 and that that portion of the valve which contains the inlets 23 and 26 is separated from the other portion by a fluid-tight and flexible partition 27 in contact with an annular seat 28 formed by the extension of the passage 26.

It is apparent that if the pressure in the tank 1 is applied to the inlet 25, and the pressure in the vessel 7 is applied to the inlet 23 then when the pressure in the tank 1 is greater than that which prevails in the expansion vessel 7, the diaphragm 27 is sealingly flattened against the seat 28. No displacement of liquid can then take place through the conduit 23.

When the pressure in the tank 1 drops, after cooling or evacuation of part of the air in the canister and thence to the atmosphere, this condition is transmitted to the valve via the conduit 25. The pressure communicated to the liquid from the expansion vessel 7, via the conduit 23, then drops to allow the membrane 27 to lift from the seat 28, enabling the liquid to return to the tank 1, thus emptying the expansion vessel 7.

Now, in accordance with the embodiment described above with reference to FIG. 4, it is apparent that the expansion vessel 7 is situated at a higher level than the main tank 1 and its filler pipe 2. This specific positioning restricts the flexibility of positioning the expansion vessel 7 in the body of the vehicle.

In the event of the expansion vessel being situated at a lower level than the maximum filling level of the tank 1, and especially when the fuel return line from the expansion vessel 7 to the main tank 1 forms a syphon, an unpriming of the syphon occurs periodically, with consequent interruption of the return of fuel to the tank.

In order to remedy this defect there is contemplated the possible repriming of that conduit which forms the syphon between the expansion vessel and the tank, so that the expansion vessel may be positioned in any location in the body of the vehicle.

In FIG. 8 there is shown a main tank 1 communicating with an expansion vessel 7 via a conduit 29 which enables air under pressure (for example a pressure increase arising when the vehicle is subjected to a rise in temperature) and in certain cases fuel, to be evacuated. A line 44 connects the expansion vessel 7 to the canister or receptacle containing activated charcoal.

The fuel returns from the expansion vessel 7 to the tank 1 through the intermediary of a conduit 30 which forms a syphon at its upper portion 30a.

Downstream of its syphon-forming portion 30a the conduit 30 is provided with a means 31 for repriming the circuit.

This repriming means 31, which is shown in greater detail in FIG. 9, comprises a chamber 32 which is connected to the ends 40 and 30c of the return line 43 from the petrol pump 41 to the tank 1.

The upper portion of the chamber 32 has threadedly secured, in a tapped bore 35, a convergent cone 33 with an interposed sealing washer 34. Into the convergent cone 33 there is threadedly fitted, in a tapped bore 36, the threaded end 37 of the return line 30 from the petrol pump to the tank.

The reduced orifice 38 of the convergent cone 33 opens into a flared portion 39 of the chamber 32 so as to form a venturi.

The outputs from the petrol pump 41 are connected on the one hand to the carburettor (not shown), via a line 42, and on the other hand to the upper portion 30b of the chamber 32, via the line 43, while the said chamber 32 is connected to the expansion vessel 7 by the conduit 40, 30a.

In use the petrol pump 41, which operates at a constant delivery rate greater than the flow rate generally necessary for supplying the carburettor, has a by-pass which returns the excess fuel to the tank 1, via the already mentioned line 43, through 30b and 30c. In this manner the circulation of fuel through the chamber 32 creates in the chamber a reduced pressure which is transmitted to the level of the inlet of the line 40 and which is thus utilised for the possible repriming of the syphon 30a and emptying of the expansion vessel 7. The chamber 32 thus acts as an ejector pump.

Of course the venting device according to the invention may include minor modifications without departing from the scope of the invention as defined by the following statement of claim. For example the distribution element 17, and the conduits 12, 13, 14 and 15 may all be positioned exteriorly of the tank 1 but adapted to be connected thereto.

I claim:
1. A vented fuel tank equipped with anti-pollution means to prevent escape of vapourised fuel into the atmosphere, comprising an expansion vessel, a plurality of venting conduits adapted to open into said tank at spaced locations therein, a distribution valve connected to all of said venting conduits, first conduit means communicating said distribution valve with said expansion vessel, second conduit means extending between said expansion vessel and the tank, and non-return valve means in said second conduit means preventing flow along said second conduit means from said tank towards said expansion chamber, said first and second conduit means opening into said expansion vessel at vertically spaced locations with said first conduit means opening above said second conduit means, and said distribution valve comprising gravity-responsive control means for communicating said first conduit means with only that one of said venting conduits of which the said location of opening into the tank is higher than the said location of each of the other venting conduits.

2. A vented fuel tank as set forth in claim 1, wherein said gravity-responsive control means includes a pendulum.

3. A vented fuel tank as set forth in claim 2, wherein said distribution valve comprises a spherical cap into which said venting conduits open, a closure member consisting of a spherical cup disposed within said cap and secured to said pendulum, and means formed inwardly of said spherical cap for defining a seating for sealingly receiving said spherical cup.

4. A vented tank as set forth in claim 1, wherein said second conduit means includes first and second conduit portions extending between said non-return valve and said tank and running in parallel, and a third conduit portion extending between said non-return valve and said expansion chamber, and wherein said non-return valve further includes a chamber connected to said first conduit portion and to said third conduit portion, and a pressure-responsive closure member positioned to interrupt communication between said third conduit portion and said first conduit portion in response to a pressure in the second conduit portion less than the pressure in said third conduit portion.

5. A vented fuel tank as set forth in claim 1, wherein said second conduit means includes a syphon conduit portion and means between said syphon conduit portion and said tank for repriming said syphon conduit portion.

6. A vented fuel tank as set forth in claim 5, and including a fuel pump and means for recycling fuel from said pump to said tank, and wherein said repriming means includes ejector pump means connected to said second conduit means and to said fuel recycling means; and wherein said ejector pump means has a liquid inlet port communicated with said fuel recycling means, a suction port communicated with said syphon conduit portion, and an outlet port connected to said tank.

7. A vented fuel tank as set forth in claim 6, wherein said ejector pump means comprises a chamber with said liquid inlet port and said outlet port extending coaxially therewith from opposite ends of said chamber and said suction port opening laterally into said chamber, and including convergent conical passage means between said liquid inlet port and the centre of said chamber, said convergent conical passage means having an apical orifice and said chamber having a flared portion surrounding said apical orifice.

8. A vented fuel tank as set forth in claim 1, wherein said distribution valve is disposed in the top of said tank and said venting conduit portions all lead from said distribution valve outwardly along the inside of the top wall of said tank to their respective locations of opening into the tank.

* * * * *